United States Patent [19]

Yamazaki

[11] Patent Number: 4,622,504
[45] Date of Patent: Nov. 11, 1986

[54] SPEED CORRECTING DEVICE FOR USE IN SPEED COMMAND SYSTEM

[75] Inventor: Etuo Yamazaki, Hachioji, Japan

[73] Assignee: Fanuc Ltd, Minamitsuru, Japan

[21] Appl. No.: 489,087

[22] Filed: Apr. 27, 1983

[30] Foreign Application Priority Data

Apr. 28, 1982 [JP] Japan .................. 57-71824

[51] Int. Cl.⁴ .................................. G05B 13/00
[52] U.S. Cl. ........................ 318/561; 318/615; 318/632
[58] Field of Search .......... 318/632, 561, 615, 616, 318/617, 618

[56] References Cited

U.S. PATENT DOCUMENTS

| | | | |
|---|---|---|---|
| 3,828,168 | 8/1974 | O'Callaghan et al. | 318/615 X |
| 3,917,930 | 11/1975 | Davey et al. | 318/632 X |
| 4,099,113 | 7/1978 | Hayashi | 318/561 X |
| 4,139,811 | 2/1979 | Klinger | 318/615 |
| 4,262,239 | 4/1981 | Kawa | 318/632 X |
| 4,368,412 | 1/1983 | Inoue | 318/632 |
| 4,486,693 | 12/1984 | Hamati et al. | 318/615 X |

*Primary Examiner*—B. Dobeck
*Attorney, Agent, or Firm*—Staas & Halsey

[57] ABSTRACT

In a speed correcting device for use in a speed command system such as a numerical controller or a tracer controller in which a movable machine part is driven at a speed corresponding to a speed command value, an error in the moving speed of the movable machine part is removed by detecting the moving speed corresponding to the speed command value being zero and by adding to the speed command value a moving speed correction amount that cancels the detected moving speed.

7 Claims, 8 Drawing Figures

SPEED CORRECTING DEVICE FOR USE IN SPEED COMMAND SYSTEM

BACKGROUND OF THE INVENTION

1. Field of the Invention

The present invention relates to a speed correcting device for use in a speed command system of an apparatus having a movable machine part which is driven at a speed corresponding to a speed command value and, more particularly, to a speed correcting device which permits driving of the movable machine part at a speed accurately corresponding to the speed command value.

2. Description of the Prior Art

In a machine tool or the like, a movable machine part is driven at a speed corresponding to a speed command value received from a tracer controller, numerical controller or the like. But a defect in this method is that the driving speed of the movable machine part differs from the speed command value due to the influence of an offset voltage in the speed command system aging of an element used changing its characteristics. To avoid this, it is a general practice in the prior art to provide a variable resistor for speed control in the speed command system and to manually vary the resistance of the variable resistor, thereby bringing the actual moving speed of the movable machine part into agreement with the speed command value. But this method not only increases the work of the operator but also lacks accuracy because of the manual adjustment of the variable resistor.

SUMMARY OF THE INVENTION

It is therefore an object of the present invention to provide a speed correcting device which is free from the above-said defects of the prior art and permits driving of a movable machine part at a speed exactly corresponding to a speed command.

Another object of the present invention is to provide a speed correcting device which automatically brings the moving speed of a movable machine part into correspondence with a speed command.

Still another object of the present invention is to provide a speed correcting device with which control of automatically correcting the moving speed of a movable machine part into agreement with a given speed command value even while the speed command value is being received by the speed correcting device.

Briefly stated, the speed correcting device of the present invention is suitable for use in a speed command system for controlling an apparatus having a movable machine part which is driven at a speed corresponding to a speed command value. Such a speed command system being, for example, a numerical controller, tracer controller or the like, and having a position detector for detecting the position of the movable machine part, a velocity error detecting means for detecting, on the basis of the position detected by the position detector, the moving speed of the movable machine part corresponding to the speed command value being zero, and an adding means for adding the detected moving speed as an amount of correction to the speed command value.

BRIEF DESCRIPTION OF THE DRAWINGS

FIGS. 1 to 4 are block diagrams respectively illustrating embodiments one through four of the present invention;

DESCRIPTION OF THE PREFERRED EMBODIMENTS

Figure 1:
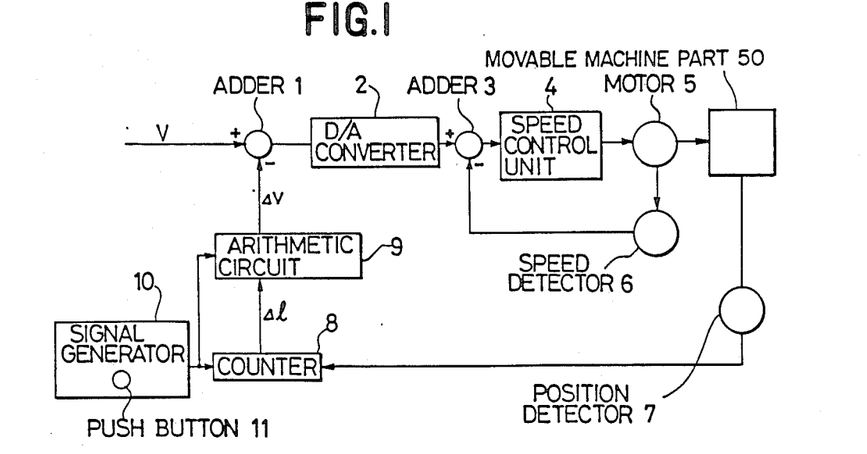

FIG. 1 is a block diagram of a first embodiment of the present invention. In FIG. 1, reference numeral 1 indicates an adder; reference numeral 2 designates a D/A converter; reference numeral 3 identifies an adder; reference numeral 4 denotes a speed control unit; reference numeral 5 represents a moter; reference numeral 6 shows a speed detector; reference numeral 7 refers to a position detector; reference numeral 8 signifies a counter; reference numeral 9 indicates an arithmetic circuit; and reference numeral 10 designates a signal generator which yields providing an output "1" for a certain period of time $\Delta t$ when a push button 11 is pressed. The adder 1 is supplied with a speed command value V (a digital quantity) from a tracer controller, numerical controller or the like (not shown); the D/A converter 2 applies the output of the adder 1 to the adder 3; and the speed control unit 4 drives the motor 5 on the basis of the output of the adder 3, i.e., in accordance with a difference between the output of the D/A converter 2 and the speed detected by the speed detector 6. Since such operations are already well-known, no detailed description is provided.

With the device shown in FIG. 1, the speed correcting operation starts with reducing the speed command value V, which is provided to the adder 1, to zero. At this time, if an offset voltage is present in the speed command system, from the D/A converter 2 to the motor 5, due to aging of an element in the speed command system, the motor 5 is driven at a speed corresponding to the offset voltage despite the speed command value V being zero. As a result, pulses corresponding to the amount of movement of a movable machine part (not shown) driven by the motor 5, are applied by the position detector 7 to the counter 8.

The counter 8 counts the number of pulses received from the position detector 7 when the signal generator 10 output is a "1" in response to the button 11 being pushed by the operator. The count in the counter 8 corresponds to the amount of movement $\Delta l$ of the movable machine part during the time $\Delta t$. Accordingly, the amount of movement $\Delta l$ of the movable machine part during the time interval $\Delta t$ can be obtained by depressing the push button 11 of the signal generator 10. When the output signal of the signal generator 10 is a "1", the arithmetic circuit 9 performs Eq. (1) using the amount of movement $\Delta l$ of the movable machine part received from the counter 8 and the predetermined time $\Delta t$ to derived the moving speed $\Delta v$ of the movable machine part at this time. The result is applied to the adder 1.

$$\Delta v = \Delta l \div \Delta t \tag{1}$$

The moving speed Δv thus obtained is generated as an offset voltage for the speed command system, so that by providing the speed Δv as a correction amount to the adder 1, the offset voltage in the speed command system is cancelled. Thus, the moving speed of the movable machine part is reduced to zero. Accordingly, by correcting the speed command value V with the moving speed Δv, i.e. (V−Δv), the movable machine part moves at a speed corresponding to the speed command value V.

Figure 5:
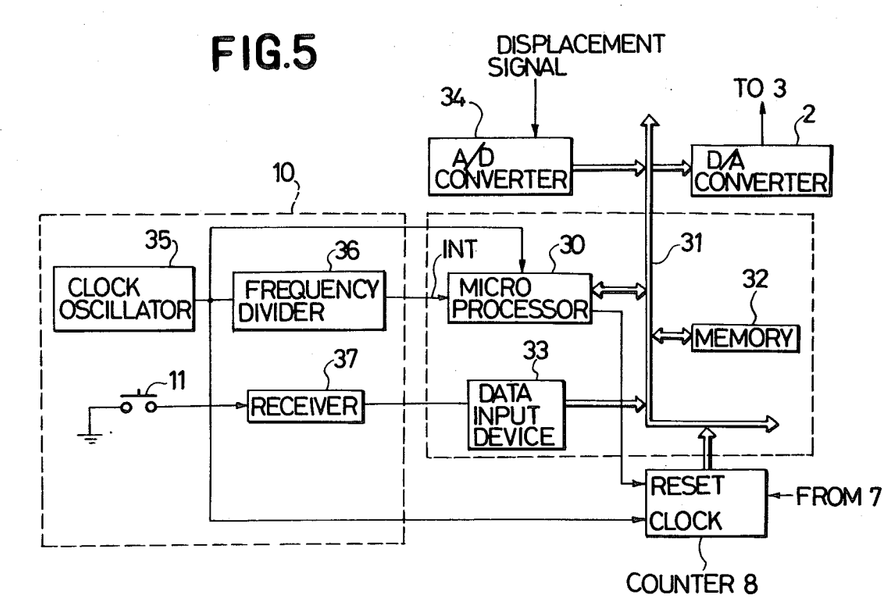
FIG. 5 is a block diagram illustrating a specific arrangements for a counter 8, an arithmetic circuit 9, a signal generator 10 and an adder 1 of the embodiment of FIG. 1.

FIG. 5 is a block diagram illustrating an example embodiment of the counter 8, the arithmetic circuit 9, the signal generator 10 and the adder 1 used in the embodiment of FIG. 1. The parts corresponding to those in FIG. 1 are identified by the same reference numerals. Reference numeral 30 indicates a microprocessor; reference numeral 31 designates its bus; reference numeral 32 identifies a memory; reference numeral 33 denotes a data input device; reference numeral 34 represents an A/D converter; reference numeral 35 denotes a clock oscillator; reference numeral 36 refers to a frequency divider; and reference numeral 37 signifies a receiver. The microprocessor 30 is connected via the bus 31 to the memory 32, to the A/D converter 34, to the D/A converter 2, to the counter 8 and to the data input device 33. The microprocessor 30 operates in synchronism with output pulses from the clock oscillator 35 and services an interrupt from the frequency divider 36 which frequency divides the output pulses from the clock oscillator 35.

Figures 6, 7:
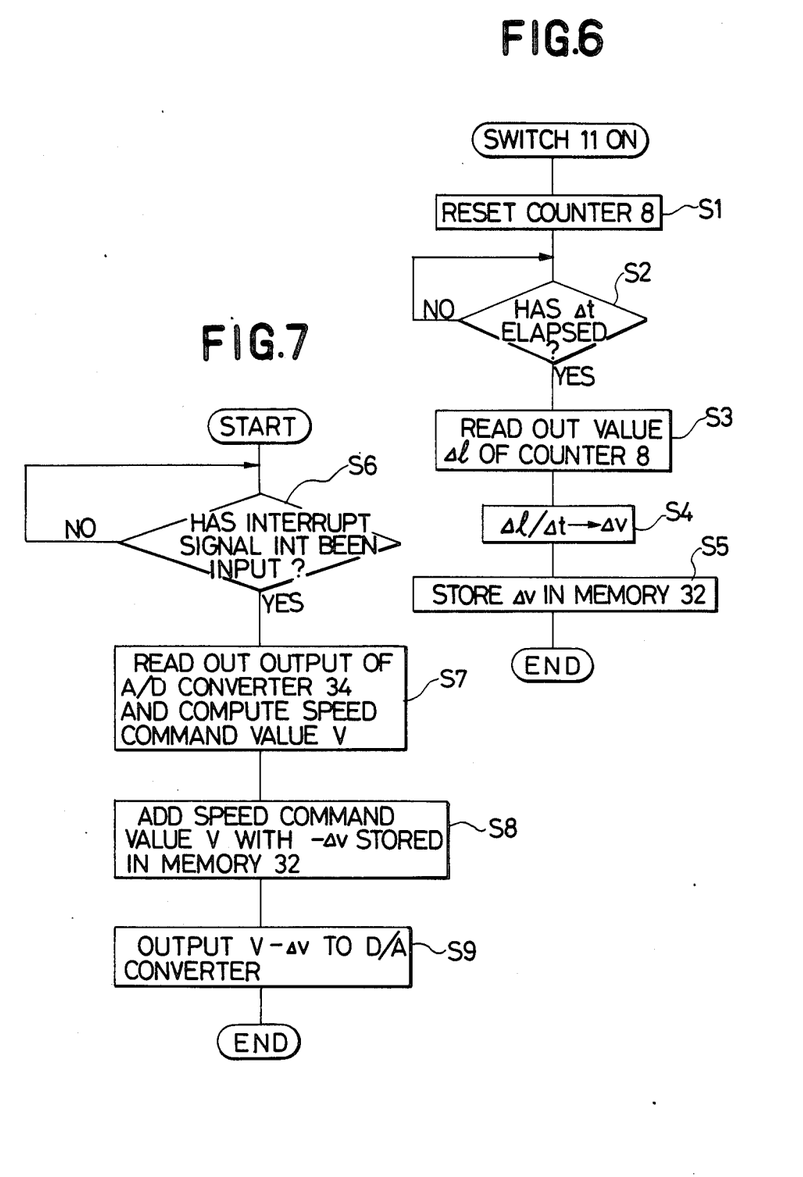
FIG. 6 is a flowchart illustrating the operation of a microprocessor for obtaining a moving speed $\Delta v$ of a movable machine part.
FIGS. 7 and 8 are flowcharts illustrating different examples of an operation of the microprocessor 30 for controlling a speed command value for the movable machine part.

FIG. 6 is a flowchart illustrating an operation of the microprocessor 30 for obtaining the moving speed Δv. Upon turning ON the switch 11, the microprocessor 30 resets the counter 8 (S1) and reads out the value of the counter 8 after the time Δt has elapsed (S2, S3). Then the microprocessor 30 computes ΔL/Δt (S4) and stores the result Δv in the memory 32 (S5).

FIG. 7 is a flowchart showing an example of an operation of the microprocessor 30 for controlling the speed command for the movable machine part. When supplied with an interrupt signal INT from the frequency divider 36, the microprocessor 30 reads out the output of the A/D converter 34 to which is applied a displacement signal of a tracer head in a tracer controller, and computes the speed command value V by a known method (S6, S7), and then adds the computed speed command value V with −Δv stored in the memory 32 (S8). After this, the microprocessor 30 outputs the value V−Δv to the D/A converter 2 (S9).

Figure 2:
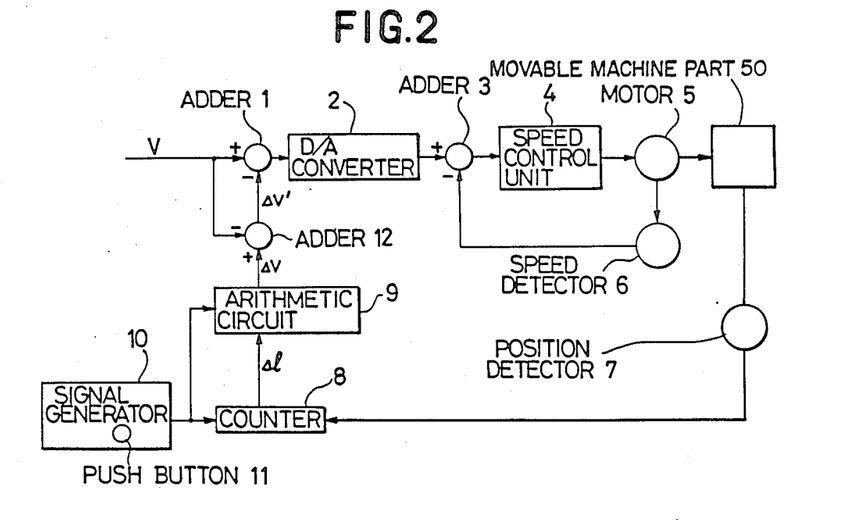

FIG. 2 is a block diagram of a second embodiment of the present invention, which differs from the embodiment of FIG. 1 in that an adder 12 is provided for applying a difference between the speed command value V and the speed Δv from the arithmetic circuit 9, i.e. (Δv′=Δv−V), to the adder 1. Incidentally, the same reference numerals are used in FIG. 2 as in FIG. 1 where the components are the same.

When the operator depresses the push button of the signal generator 10 and when the system is receiving an arbitrary speed command value V (including a value of zero) from a tracer controller or numerical controller, the counter 8 and the arithmetic circuit 9 perform the same operations as described above. Consequently, the speed Δv (the actual moving speed of the movable machine part) which is derived from the arithmetic circuit 9 at this time is the sum of the speed command value V and a speed Δv_s caused by the offset voltage of the speed command system as indicated by the following Eq. (2):

$$\Delta v = V + \Delta v_s \tag{2}$$

Since the adder 12 obtains the difference between the speed Δv from the arithmetic circuit 9 and the speed command value V as described above, the output Δv′ of the adder 12 is equal to the speed Δv_s which is due to the system offset voltage. Therefore, the influence of the offset voltage of the speed command system can be removed by applying the output Δv′ of the adder 12, as an input correction amount, to the adder 1 so that the movable machine part can be moved at a speed equal to the speed command value V. Incidentally, the arithmetic circuit 9 continues to output the speed Δv, obtained per the above description until the output of the signal generator 9 changes to a "1". In this way, this embodiment can obtain a correction amount during the application of an arbitrary speed command value, and hence it is a simple operation compared to the embodiment of FIG. 1 which requires reducing the speed command value V to zero when obtaining the correction amount.

The counter 8, the arithmetic circuit 9, the signal generator 10 and the adders 1 and 12 shown in FIG. 2 can also be realized using the circuit arrangements depicted in FIG. 5. Also it is possible to compute the moving speed Δv in a manner similar to that employed in FIG. 5.

Figure 8:
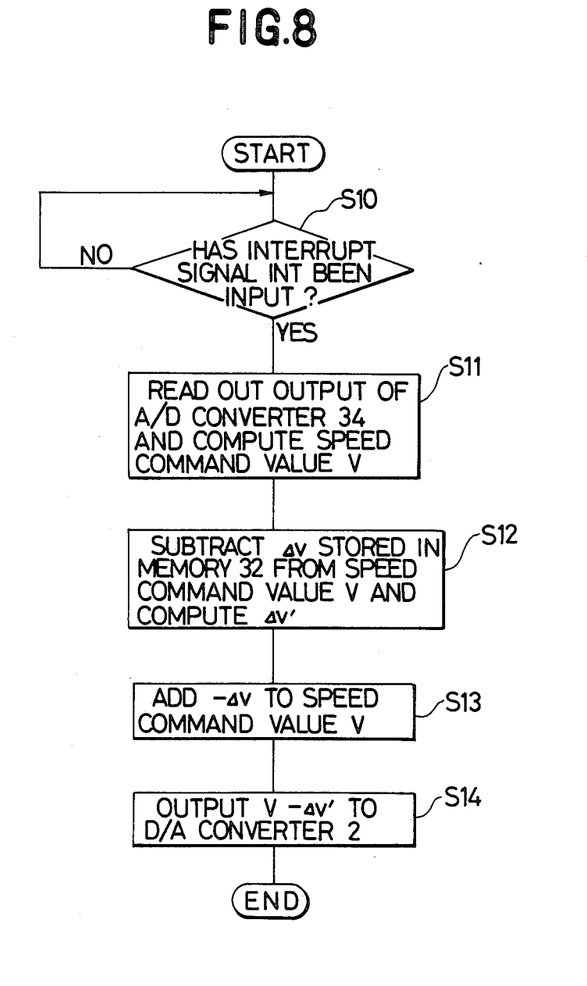

FIG. 8 is a flowchart showing an example of an operation of the microprocessor 30 for controlling the speed command for the movable machine part in the case where the operation of the embodiment of FIG. 2 is placed under the control of the microprocessor 30. Referring to FIGS. 5 and 8, when supplied with the interrupt signal INT from the frequency divider 36, the microprocessor 30 reads out the output of the A/D converter 34 which receives the displacement signal of the tracer head, and then computes the speed command value V using a known method (S10, S11). The microprocessor 30 then subtracts Δv stored in the memory 32 from the speed command value V to obtain Δv′ (S12). After this, the microprocessor 30 adds −Δv′ to the speed command value V (S13) and outputs the result to the D/A converter 2 (S14).

Figure 3:
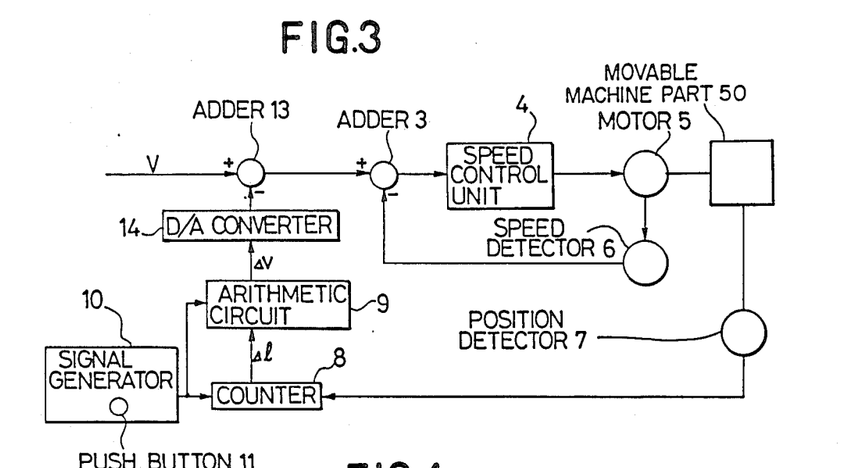

FIG. 3 is a block diagram of a third embodiment of the present invention, which is a modification of the embodiment of FIG. 1. In this embodiment, the speed command value V is an analog signal.

This embodiment differs from the embodiment of FIG. 1 in that the output of the arithmetic circuit 9 is applied via a D/A converter 14, and the output of the D/A converter is applied to an adder 13 which carries out the addition of analog quantities. With such an arrangement, it is possible to eliminate the influence of the offset voltage as in the embodiment of FIG. 1 even if the speed command value V is an analog quantity. In FIG. 3, the same reference numerals are used as in FIG. 1, where the components are the same.

Figure 4:
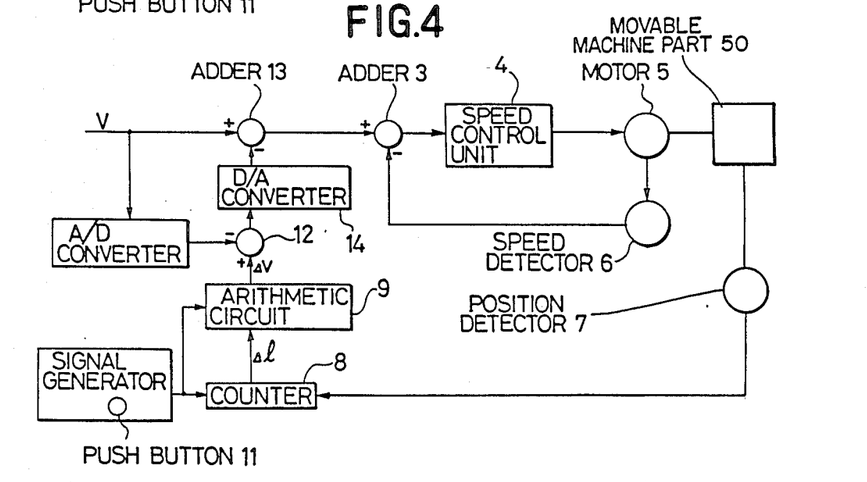

FIG. 4 is a block diagram of a fourth embodiment of the present invention, which is a modified form of the embodiment of FIG. 2 and in which the speed command value V is an analog signal.

This embodiment differs from the embodiment of FIG. 2 in that the speed command value V is applied via an A/D converter 15 to the adder 12 and that the output of the adder 12 is applied via a D/A converter 14 to the adder 13 which performs the addition of analog quantities. With such an arrangement, it is possible to avoid the influence of the offset voltage, as in the embodiment of FIG. 2, even if the speed command value V is an analog quantity. In FIG. 4, the same components as those in FIG. 2 are identified by the same reference numerals.

It will be apparent that many modifications and variations may be effected without departing from the scope of the novel concepts of the present invention.

What is claimed is:

1. A speed correcting device for use in a speed command system of an apparatus in which a movable machine part is driven at a speed corresponding to a speed command value, said device comprising:

a position detector for detecting the position of the movable machine part;

velocity error detecting means for detecting, on the basis of the position detected by the position detector, the moving speed of the movable part when the speed command value is zero; and adding means for adding the detected moving speed to the speed command value to correct the speed command value so that the moving speed corresponds to the speed command value.

2. A speed correcting device according to claim 1, wherein said speed detecting means is operatively connected to receive the speed command value and said arithmetic means comprises:

divider means for dividing said count output by said predetermined output and for providing a first output responsive to said division; and first adder means for subtracting said first output from said speed command value and for providing said speed output being responsive to said subtraction.

3. A speed correcting device according to claim 2, wherein said correction means comprises:

second adder means, for subtracting said speed output from said speed command value, and for providing said corrected output being responsive to said subtraction.

4. A speed correcting device according to claim 3, wherein said speed command value is an analog signal and said device further comprises:

digital to analog converter means, operatively connected between said second adder means and said first adder means, for converting said speed output to an analog signal; and analog to digital converter means, operatively connected to receive said speed command value, for converting the speed command value into a digital signal, and for applying this digital signal to said first adder means as said speed command value.

5. A speed correcting device according to claim 1, wherein said correction means comprises:

first adder means for subtracting said speed output from said speed command value and for providing said corrected output being responsive to said subtraction.

6. A speed correcting device according to claim 5, wherein said speed detecting means comprises:

counter means, operatively connected to said position detector means, for providing a count output responsive to said movement signal; and arithmetic means, operatively connected to said counter means, for measuring a predetermined time period and for providing said speed output in accordance with said count output and said predetermined time period.

7. A speed correcting device according to claim 6, wherein said speed command value is an analog signal and said device further comprises:

digital to analog converter means, operatively connected between said first adder means and said arithmetic means, for converting said speed output to an analog signal.

* * * * *

UNITED STATES PATENT AND TRADEMARK OFFICE
CERTIFICATE OF CORRECTION

PATENT NO. : 4,622,504        Page 1 of 2

DATED : November 11, 1986

INVENTOR(S) : Yamazaki

It is certified that error appears in the above-identified patent and that said Letters Patent is hereby corrected as shown below:

Column 2, line 52, "(not shown)" should be --50--.

Column 5, lines 13 to 27 Claim 1 should read as follows:

1. A speed correcting device for correcting a speed command value received from a speed command system for commanding the speed of a movable machine part in accordance with a speed command value, said device comprising:

a position detector means for detecting the movement of the movable machine part and for providing a movement signal responsive to the detected movement;

speed detecting means, operatively connected to said position detector means, for detecting the speed of the movable machine part in accordance with said movement signal, and for providing a speed output corresponding to the speed of the movable machine part when the speed command value is zero, said speed detecting means including -- counter means, operatively connected to said position detector means, for providing a count output responsive to said movement signal, and

UNITED STATES PATENT AND TRADEMARK OFFICE
CERTIFICATE OF CORRECTION

PATENT NO. : 4,622,504

DATED : November 11, 1986

INVENTOR(S) : Yamazaki

It is certified that error appears in the above-identified patent and that said Letters Patent is hereby corrected as shown below:

arithmetic means, operatively connected to said counter means, for measuring a predetermined time period and for providing said speed output in accordance with said count output and said predetermined time period; and correction means, operatively connected to receive the speed command value and to receive said speed output, for adjusting the speed command value in accordance with said speed output, and for providing a corrected output, varying in accordance with said adjustment, for driving the speed command system so that the movable machine part moves in response to said corrected output at a speed corresponding to the command value.

Signed and Sealed this

Seventeenth Day of February, 1987

*Attest:*

DONALD J. QUIGG

*Attesting Officer*   *Commissioner of Patents and Trademarks*